United States Patent
Prabhakaran et al.

(10) Patent No.: US 8,881,143 B2
(45) Date of Patent: Nov. 4, 2014

(54) OPTIMIZATION FRAMEWORK FOR REMOTELY EXECUTING A MAINTENANCE OPERATION ON A VIRTUAL MACHINE

(76) Inventors: Diwakar Prabhakaran, Bangalore (IN); Hemanth Kumar Kilari, Bangalore (IN); Dinesh Babu T G, Bangalore (IN)

( * ) Notice: Subject to any disclaimer, the term of this patent is extended or adjusted under 35 U.S.C. 154(b) by 346 days.

(21) Appl. No.: 13/289,466

(22) Filed: Nov. 4, 2011

(65) Prior Publication Data
US 2013/0117741 A1 May 9, 2013

(51) Int. Cl.
*G06F 9/455* (2006.01)
*G06F 11/14* (2006.01)

(52) U.S. Cl.
CPC ............ *G06F 9/455* (2013.01); *G06F 11/1438* (2013.01); *G06F 11/1484* (2013.01); *G06F 9/45558* (2013.01)
USPC ............................................................ 718/1

(58) Field of Classification Search
USPC ...................................... 718/1, 100
See application file for complete search history.

(56) References Cited

U.S. PATENT DOCUMENTS

| | | | |
|---|---|---|---|
| 7,810,092 B1 * | 10/2010 | van Rietschote et al. | 718/1 |
| 2008/0072222 A1 * | 3/2008 | Bantz et al. | 718/1 |
| 2009/0271786 A1 * | 10/2009 | Groth | 718/1 |
| 2010/0011358 A1 * | 1/2010 | Kettler et al. | 718/1 |
| 2011/0125894 A1 * | 5/2011 | Anderson et al. | 709/224 |
| 2011/0237234 A1 * | 9/2011 | Kotani et al. | 455/418 |
| 2011/0239210 A1 * | 9/2011 | Kotani et al. | 717/171 |

* cited by examiner

Primary Examiner — Van Nguyen

(57) ABSTRACT

Embodiments provide a system for executing a maintenance operation on a virtual machine (VM). The system includes a host computing device including a first VM and a second VM, a maintenance application installed within the first VM, and an optimization framework providing an interface to the maintenance application. The system also includes an optimization server coupled to the maintenance application through the optimization framework. The optimization server is configured to select a maintenance operation to execute on the second VM and command the maintenance application to execute the maintenance operation on the second VM.

27 Claims, 6 Drawing Sheets

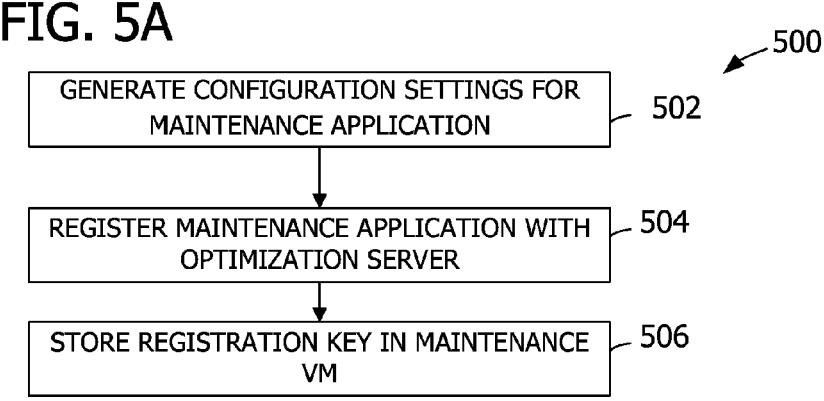
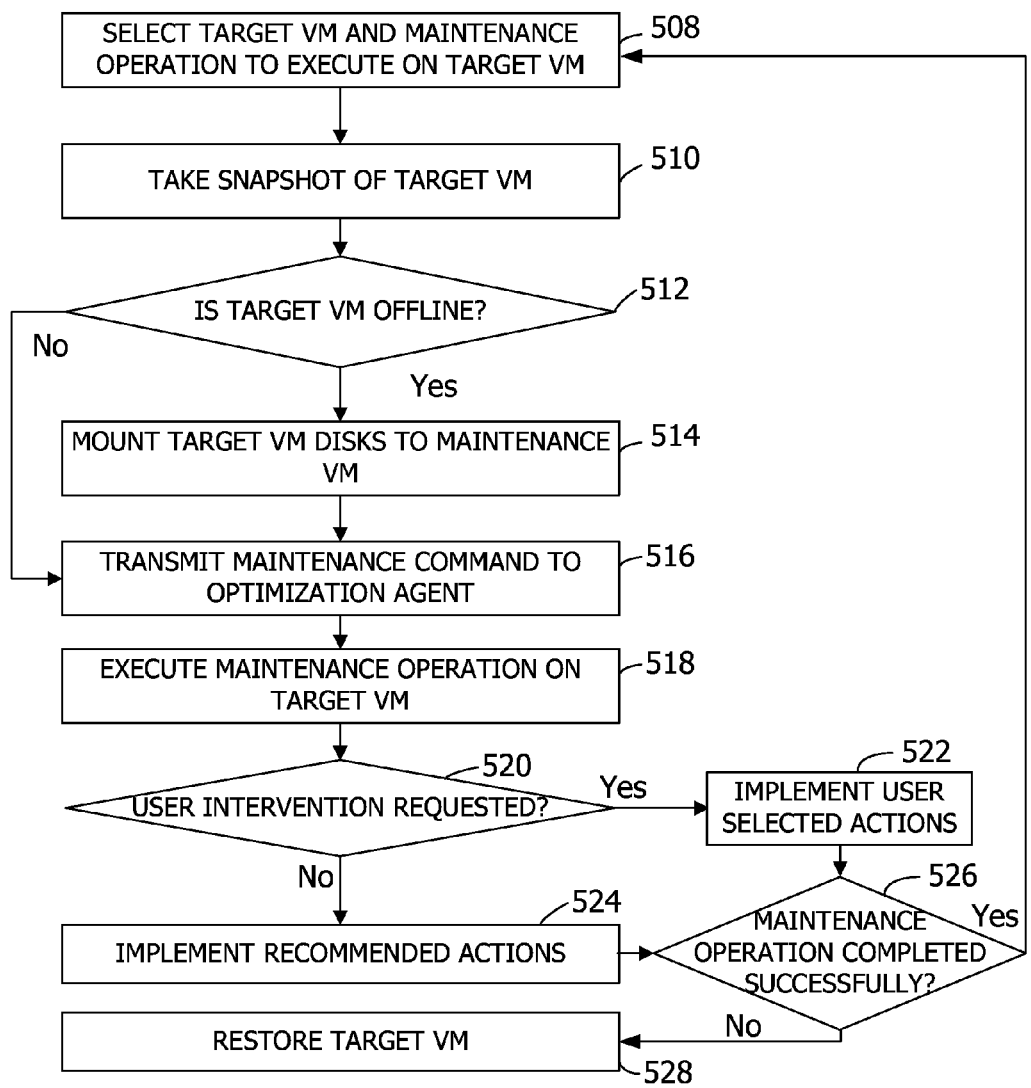

OPTIMIZATION FRAMEWORK FOR REMOTELY EXECUTING A MAINTENANCE OPERATION ON A VIRTUAL MACHINE

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

Over time, VMs may experience degradation in performance, for example, as a result of the installation and removal of applications. More specifically, such performance degradation may result from increasing amounts of memory being allocated to temporary files and/or other undesired files within the VMs, increased execution time resulting from fragmented files within one or more virtual disks of the VMs, and/or increased execution time resulting from invalid or obsolete entries within system registries associated with operating systems installed on the VMs. To improve the performance of such VMs, intermittent or periodic maintenance may be performed on the VMs. Such maintenance may include, for example, removing undesired files from the VM or the applications of the VM, removing invalid or obsolete entries within an operating system registry, defragmenting one or more disks or memories associated with the VM, and/or any other suitable maintenance task or action.

Maintenance programs typically execute maintenance tasks from within the VM undergoing maintenance (hereinafter referred to as the "target VM"). More specifically, the target VM executes the maintenance program, and the maintenance program performs one or more maintenance tasks on or within the target VM. However, such an individualized approach to VM maintenance requires a user to keep the maintenance tool updated on each VM within a virtual infrastructure or system that may include hundreds or thousands of VMs. Moreover, an individual user may not perform maintenance tasks on target VMs with an optimal frequency. Accordingly, maintenance tasks may not be executed on an underperforming VM for an extended period of time, and the underperforming VM may also affect a performance of other VMs.

Moreover, existing maintenance programs may perform remote maintenance on a target VM. However, such remote maintenance often uses transmission control protocol and internet protocol (TCP/IP) and may be hindered by the presence of security measures, such as firewalls, operating within the VM or the computing device hosting the VM. Circumventing such security measures to perform remote maintenance on VMs may reduce the security of the VM and/or the host computing device. In addition, such maintenance programs may be unable to perform maintenance tasks on a VM that is offline.

Remote maintenance of VMs within different network domains may require an agent to be installed and executing within the VM. However, if agents are installed within VMs, the agents may need to be periodically updated, for example, with software patches or upgrades. Furthermore, existing maintenance programs may require a remote registry service to perform a registry maintenance operation on a VM executing a Microsoft WINDOWS brand operating system. The remote registry service generally must be executing in the VM, and the server or other device executing the maintenance operation must have sufficient privileges to access the VM.

SUMMARY

One or more embodiments described herein provide an optimization framework and optimization server for improving the performance of one or more target VMs. The optimization framework provides an interface between the optimization server and a maintenance application. More specifically, the optimization framework includes a plurality of concrete APIs, a plurality of interface APIs, and a framework agent that acts as a bridge between the optimization server and the maintenance application. The optimization server selects a maintenance operation to be executed on a target VM and calls the optimization framework with inventory details of the VM. The optimization framework facilitates gathering required data for performing the maintenance operation from the target VM and transmitting a maintenance command to the maintenance application. The maintenance application executes the maintenance operation on the target VM and the results of the maintenance operation are transmitted to the optimization server. In one embodiment, a user configures the optimization server such that the result of the maintenance operation is transmitted to the user for user intervention.

This summary introduces a selection of concepts that are described in more detail below. This summary is not intended to identify essential features, nor to limit in any way the scope of the claimed subject matter.

BRIEF DESCRIPTION OF THE DRAWINGS

FIGS. 5A and 5B are flowcharts of an exemplary method for optimizing virtual machines.

DETAILED DESCRIPTION

Figure 1:
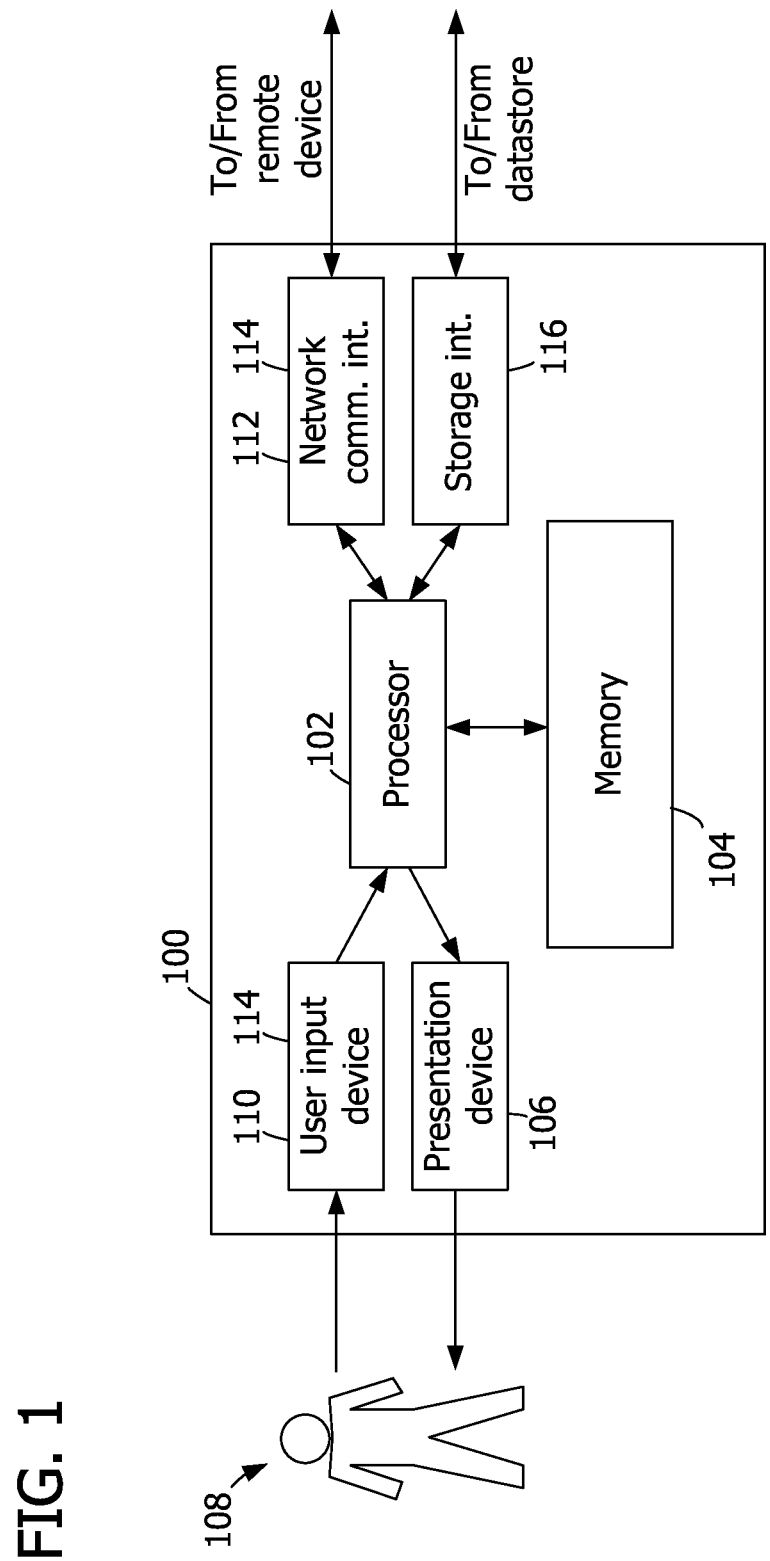
FIG. 1 is a block diagram of an exemplary computing device.

Embodiments described herein provide an optimization system for improving performance of one or more target VMs that includes an optimization framework and an optimization server. The optimization framework provides an interface between the optimization server and a maintenance application. More specifically, the optimization framework includes a plurality of concrete APIs, a plurality of interface APIs, and a framework agent that acts as a bridge between the optimization server and the maintenance application. The optimization server stores a plurality of user and/or administrator configuration settings for the maintenance application. The maintenance application is installed in a maintenance VM that is separate from the target VM, and the maintenance application is registered with the optimization server to enable trusted communication to be established between the optimization server and the maintenance application. The optimization server selects a maintenance operation to be executed on a target VM and calls the optimization framework with inventory details of the VM. The optimization framework gathers required data for performing the maintenance operation from the target VM and transmits a maintenance command to the maintenance application. If the target VM is offline, the optimization server mounts the disks of the target VM to the maintenance application to enable the maintenance application to access the target VM data. The maintenance application executes the maintenance operation on the target VM and results of the maintenance operation are transmitted to the optimization server. In one embodiment, a user configures the optimization server such that a result of the maintenance operation is transmitted to the user for user intervention.

Accordingly, the optimization server and optimization framework described herein enable maintenance operations to be selected and executed on a target VM without installing maintenance agents within the target VM. Moreover, the maintenance operations are enabled to be executed on a target VM that is offline. Further, the maintenance application is registered with the optimization server to provide authentication for the maintenance operations. The optimization server and the framework also provide a centralized infrastructure for scaling the maintenance operations across a plurality of VMs and host computing devices. For example, one or more maintenance applications may be installed within a plurality of VMs within a virtual infrastructure, and the optimization server may initiate and control the maintenance operations for each of the VMs in a centralized manner. Accordingly, the optimization server and framework described herein provide a robust, scalable, and efficient infrastructure for executing maintenance operations on target VMs.

In addition, the centralized optimization framework and optimization server enables individual VM users to be freed from VM maintenance and performance optimization. As the maintenance application and optimization framework are installed within one central location (i.e., the maintenance VM), disk space is conserved within each VM which reduces the storage and maintenance cost of a system implementing the maintenance application and the optimization framework. In addition, providing a centralized optimization server and a maintenance application to perform the maintenance operations increases the efficiency of VMs within datacenters, cloud computing, virtual desktop, and/or other environments. The increased efficiency may also cause a reduced failure incidence rate which also may reduce maintenance costs and increase productivity within a system implementing the optimization server and optimization framework.

Furthermore, because the maintenance application is installed within a dedicated VM, the maintenance application may be patched and upgraded, rather than having to patch each target VM. If the maintenance operation fails, or does not complete successfully, the target VM will be restored to a state prior to the execution of the maintenance operation, which increases the reliability of the optimization process.

In addition, maintenance operations may be performed using remote calls, without using or requiring the target VM's administrator privileges. Maintenance operations may also be performed on VM templates so that VM templates may be optimized or maintained in an optimized state. Furthermore, the optimization server, maintenance application, and optimization framework may execute maintenance operations without using TCP/IP based management or remote registry services. While the maintenance operations are described herein with respect to disk cleanup, disk defragmentation, and registry cleanup and defragmentation operations, maintenance operations may also include other tasks like software auditing and offline virus scanning.

FIG. 1 is a block diagram of an exemplary computing device 100. Computing device 100 includes a processor 102 for executing instructions. In some embodiments, computer-executable instructions are stored in a memory 104 for performing one or more of the operations described herein. Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values), from a user.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
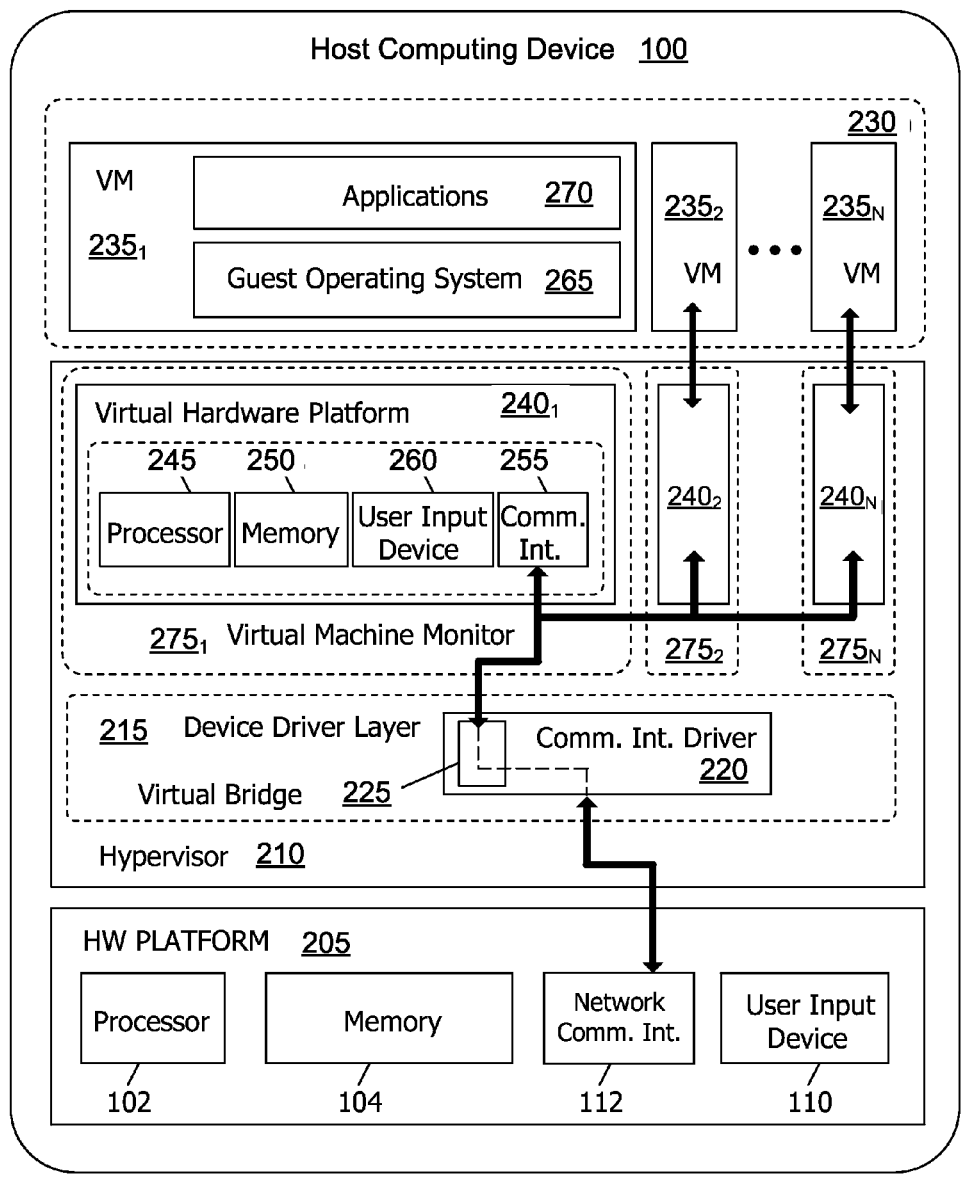
FIG. 2 is a block diagram of virtual machines that are instantiated on a computing device, such as the computing device shown in FIG. 1.

FIG. 2 depicts a block diagram of virtual machines $235_1$, $235_2 \ldots 235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$). Each virtual hardware platform includes its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
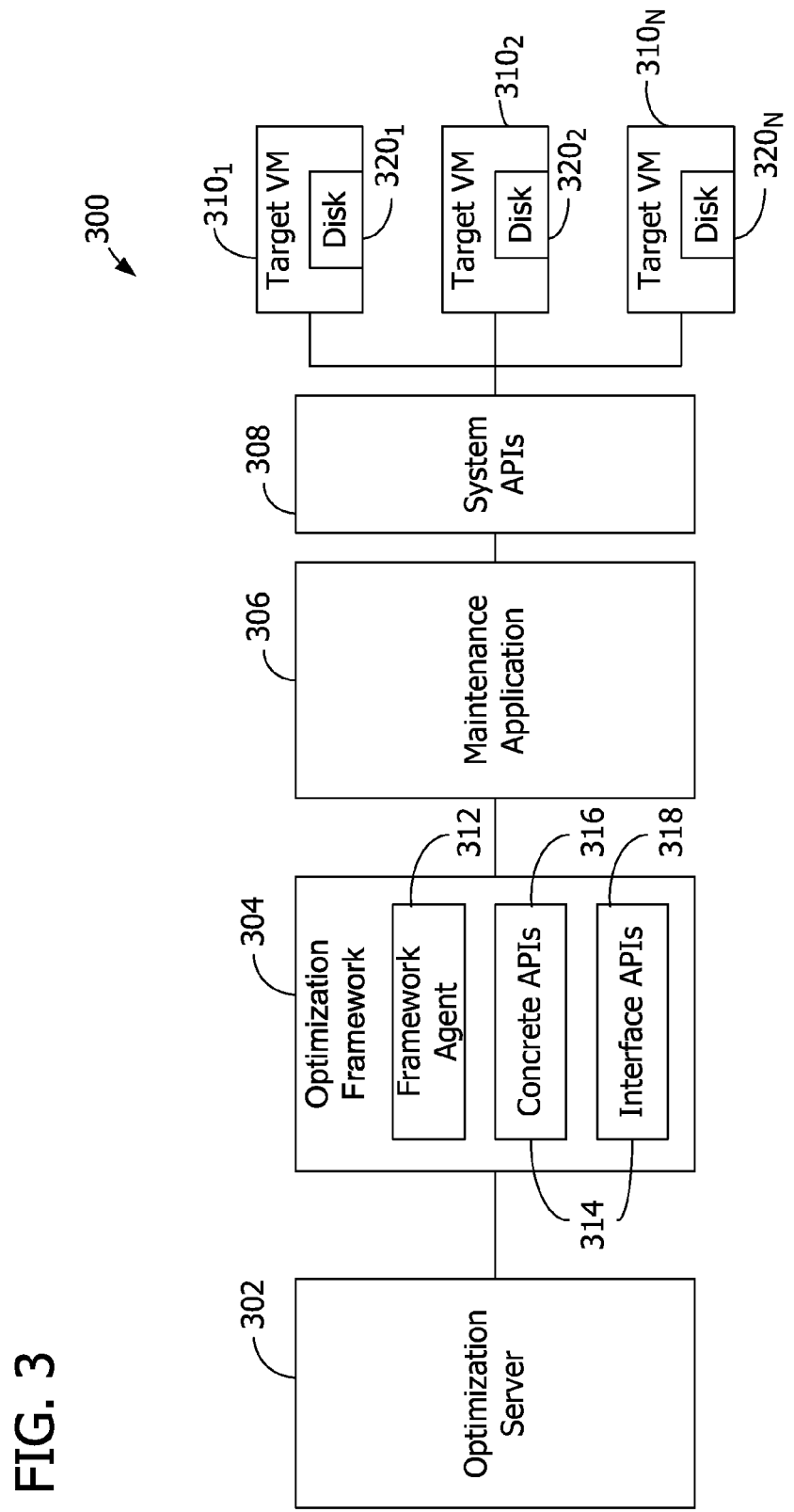
FIG. 3 is a block diagram of an exemplary optimization system including an optimization server and an optimization framework.

FIG. 3 is a block diagram of an exemplary optimization system 300 that may be used to optimize one or more applications or machines, such as one or more VMs $235_1$-$235_N$ (shown in FIG. 2). In an embodiment, system 300 includes an optimization server 302, an optimization framework 304, a maintenance application 306, a plurality of system application programming interfaces (APIs) 308, and one or more target VMs $310_1$-$310_N$. In an embodiment, system 300 is embodied within one or more computing devices 100 (shown in FIG. 1). More specifically, one or more components of system 300, such as optimization server 302, optimization framework 304, maintenance application 306, system APIs 308, and/or target VMs $310_1$-$310_N$ may be embodied in a plurality of computer-executable instructions stored within a computer readable medium, such as memory 104 and/or memory 250 (shown in FIG. 2), and may be executed by a processor, such as processor 102 and/or processor 245 (shown in FIG. 2), when the processor is programmed with the computer-executable instructions.

In an embodiment, optimization server 302 is a physical server, such as computing device 100, that controls system 300 (shown in FIG. 3) and/or initiates maintenance operations within system 300. For example, optimization server 302 may be used to manage or control maintenance applications 306, and may "trigger" maintenance applications 306, or cause maintenance applications 306 to perform maintenance operations on one or more target VMs $310_1$-$310_N$. Alternatively, optimization server 302 may be a virtual server that may be implemented by one or more VMs $235_1$-$235_N$ executing on a host, such as a computing device 100. For example, in one embodiment, optimization server 302 may be implemented as a plug-in to VI Client that operates with VC Server, both of which are available from VMware, Inc. In an embodiment, optimization server 302 is positioned remotely from target VMs $310_1$-$310_N$ such that optimization server 302 is separate from a computing device 100 or other device that hosts target VMs $310_1$-$310_N$. Alternatively, optimization server 302 may be positioned, or executed, within a target VM $310_1$. Moreover, optimization server 302 is coupled to one or more maintenance applications 306 (and/or to the VMs $235_1$-$235_N$ executing maintenance applications 306) through optimization framework 304.

Optimization framework 304 includes a set of programming functions, classes, objects, and/or other programming components that enable optimization server 302 to interface with one or more maintenance applications 306. More specifically, optimization framework 304 enables optimization server 302 to execute maintenance operations on target VMs $310_1$-$310_N$ and enables maintenance application 306 to receive commands and/or data from optimization server 302 and transmit data to optimization server 302. In an embodiment, optimization framework 304 includes a framework agent 312 and a plurality of framework APIs 314, such as a plurality of concrete, or instantiatable, APIs 316 and a plurality of interface APIs 318. At least a portion of the framework APIs 314 are implemented by the maintenance application 306 to enable the optimization server 302 to transmit maintenance operations to maintenance application 306 through optimization framework 304. In some embodiments, optimization framework 304 is provided to third party developers for use in developing maintenance application 306. In such embodiments, maintenance application 306 incorporates or implements aspects of optimization framework 304 and expects optimization framework 304 to be executing within a VM $235_1$ in which maintenance application 306 is executing. In some embodiments, optimization framework 304 is shipped with maintenance application 306 such that a user may install optimization framework 304 along with maintenance application 306.

Framework agent 312 operates as a bridge between maintenance application 306 and optimization server 302. For example, framework agent 312 may establish a data connection with optimization server 302 (i.e., between maintenance application 306 and optimization server 302) and monitor the connection to determine if optimization server 302 is requesting or commanding a maintenance operation to be executed on a target VM $310_1$. If framework agent 312 detects or receives a request or command to execute a maintenance operation (hereinafter referred to as a "maintenance command") on a target VM $310_1$, framework agent 312 requests and obtains, from target VM $310_1$, information or data associated with the target VM $310_1$, for example, using one or more system APIs 308. Such information or data associated with target VM $310_1$ may include, for example, inventory data of the target VM $310_1$, such as the number and/or size of one or more disks $320_1$-$320_N$ associated with target VM $310_1$, the type and/or version of the operating system executing on target VM $310_1$, the contents of a file allocation table (FAT), the operating system registry contents, information required to mount one or more disks $320_1$-$320_N$, and/or any other suitable information or data associated with the target VM $310_1$.

Framework agent 312 transmits the maintenance command to a maintenance application 306 by calling an associated framework API 314. The maintenance command transmitted to the maintenance application 306 includes the maintenance operation (e.g., disk defragmentation, disk cleanup, or registry cleanup) to be executed on the target VM $310_1$, inventory data of the target VM $310_1$, and user and/or administrator configuration settings. After the maintenance operation has completed, framework agent 312 transmits data representative of the maintenance operation results to optimization server 302 (and then to a user for user intervention) if optimization server 302 has been configured accordingly. For example, the maintenance results may include a summary or report based on an analysis of the target VM $310_1$ (hereinafter referred to as an "analysis report") and one or more recommended operations or actions (hereinafter referred to as "recommended actions") to perform on the target VM $310_1$ based on the results of the analysis. If optimization server 302 has not been configured to request user intervention after the maintenance operation has completed, the maintenance operation results are automatically implemented, such as by implementing the recommended actions on or within the target VM $310_1$.

In an embodiment, concrete APIs 316 are APIs that may be instantiated and/or called, for example, by maintenance application 306 to interface with components of optimization framework 304 and/or optimization server 302. In an embodiment, one function call that may be used to implement and/or access concrete APIs 316 is: void StartVMOFAgent (String), which may be used by a maintenance application 306 to initiate or start framework agent 312. Another function call that may be used to implement and/or access concrete APIs 316 is: void Connect (VMOPSHostName, VMOPSPort, RegistrationKey), which may be used by framework agent 312 to establish a connection with optimization server 302 and to enable framework agent 312 to receive maintenance commands from optimization server 302. Still another function call that may be used to implement and/or access concrete APIs 316 is: void Disconnect (RegistrationKey), which may be used to disconnect framework agent 312 from optimization server 302. In some embodiments, StartVMOFAgent may be referred to as StartOptimizationFrameworkAgent or StartFrameworkAgent. In addition, VMOPSHostName may be referred to as OptimizationServerHostName or OptimizationServerName, and VMOPSPort may be referred to as OptimizationServerPort.

In an embodiment, interface APIs 318 are APIs that are implemented by maintenance application 306 and that are called by framework agent 312. More specifically, interface APIs 318 are called by optimization server 302, through framework agent 312, to initiate, monitor, and/or receive the results of one or more maintenance operations. In one embodiment, an administrator or a user may configure maintenance application 306 to transmit the results of a maintenance operation to optimization server 302 before terminating the maintenance operation. For example, the administrator or user may desire to view the analysis report before implementing the recommended actions, and/or the administrator or user may desire to perform manual or user-selected actions based on the analysis report. In such an embodiment, a function call that may be used to receive the results of a maintenance operation, such as a disk cleanup operation, performed on an online target VM $310_1$ is: DiskCleanupResult AnalyzeDiskForCleanup (FAT[ ], Configuration, Registry). Another function call that may be used to receive the results of a maintenance operation, such as a registry cleanup operation, performed on an online target VM $310_1$ is: RegistryCleanupResult AnalyzeRegistryForCleanup (FAT[ ], Configuration, Registry). As used herein, the term "online" refers to a state that is a virtual representation of a powered-on device, and the term "offline" refers to a state that is a virtual representation of a powered-off device.

If the target VM $310_1$ is offline, a function call that may be used to receive the results of a maintenance operation, such as a disk cleanup operation, is: DiskCleanupResult AnalyzeDiskForCleanup (MountedDriveNames as String [ ], Configuration). Another function call that may be used to receive the results of a maintenance operation, such as a registry cleanup operation, is: RegistryCleanupResult AnalyzeRegistryForCleanup (MountedDriveNames as String [ ], Configuration).

In another embodiment, for one or more target VMs $310_1$-$310_N$, an administrator or a user may configure maintenance application 306 to complete the maintenance operation without prompting the administrator or the user to input a command (i.e., without user intervention) after receiving the results of the maintenance operation. In such an embodiment, a function call that may be used to receive the results of a maintenance operation, such as a disk cleanup operation, is: DiskCleanupResult CleanupDisk (FAT[ ], Configuration, Registry). Another function call that may be used to receive the results of a maintenance operation, such as a registry cleanup operation, is: RegistryCleanupResult CleanupRegistry (FAT[ ], Configuration, Registry).

If the target VM $310_1$ is offline, a function call that may be used to receive the results of a maintenance operation, such as a disk cleanup operation, is: DiskCleanupResult CleanupDisk (MountedDriveNames as String [ ], Configuration). Another function call that may be used to receive the results of a maintenance operation, such as a registry cleanup operation, is: RegistryCleanupResult CleanupRegistry (MountedDriveNames as String [ ], Configuration).

In one embodiment, a function call that may be used regardless of whether the target VM $310_1$ is online or offline and that may not require user intervention during the maintenance operation or after the maintenance operation has completed is: DefragmentationResult DefragmentDisk (DriveNames as String[ ], Configuration).

In an embodiment, maintenance application 306 is a software tool or utility that executes or performs one or more maintenance operations on a component, such as on one or more disks $320_1$-$320_N$ of a target VM $310_1$. For example, maintenance application 306 may execute maintenance operations including, for example, a disk cleanup operation on disk $320_1$ to remove undesired files and/or a disk defragmentation operation to defragment or optimize a placement of files within disk $320_1$. Maintenance application 306 may additionally or alternatively execute a maintenance operation including a registry cleanup operation on disk $320_1$ to remove undesired operating system registry files or entries, to modify one or more registry settings to improve a performance and/or a startup time of target VM $310_1$, and/or any other operation to improve a performance or operation of a target VM $310_1$. In some embodiments, maintenance application 306 may execute a maintenance operation including a virus scan and cleanup (for online or offline target VMs $310_1$-$310_{10}$, software auditing for target VMs $310_1$-$310_N$, and/or may execute an above-mentioned maintenance operation on a template of a VM $235_1$ to optimize the template.

System APIs 308 are a plurality of APIs provided by an application suite or operating system that is common to target VMs $310_1$-$310_N$, maintenance application 306, optimization framework 304, and/or optimization server 302. In one embodiment, system APIs 308 are embodied within a virtualized platform, such as vSphere, which is available from VMware, Inc. In some embodiments, system APIs 308 include vSphere 5.0 APIs and VM Tools, which are available from VMware, Inc. System APIs 308 may also include offline registry access APIs from an operating system manufacturer, such as Microsoft, Inc. for target VMs $310_1$-$310_N$ executing a Microsoft Windows brand operating system. In some embodiments, using offline registry access APIs may introduce security concerns with respect to target VM $310_1$, maintenance application 306, and/or optimization server 302. For example, the offline registry access APIs may cause registry settings and/or other private data of target VM $310_1$ to be transferred from target VM $310_1$ to another application, such as maintenance application 306. However, such security concerns may be reduced or alleviated by the registration process and the individualized and customizable configuration of maintenance application 306 as described herein.

Target VMs $310_1$-$310_N$ are VMs $235_1$-$235_N$ executing on one or more computing devices 100. More specifically, each target VM $310_1$-$310_N$ executes on a hypervisor 210 of one or more computing devices 100. Each target VM $310_1$-$310_N$ includes at least one disk $320_1$-$320_N$. In an embodiment, disk $320_1$ is embodied as a virtual disk image or file (hereinafter referred to as a "disk file") stored within a memory, such as memory 104 (shown in FIG. 2). In an embodiment, if a target VM $310_1$ is offline, framework agent 312 mounts the disk $320_1$ of the target VM $310_1$ to enable access to the files or other data stored in disk $320_1$. Framework agent 312 then invokes the maintenance operation of maintenance application 306. In such an embodiment, maintenance application 306 executes the maintenance operation by accessing data from the mounted disk $320_1$.

Moreover, in an embodiment, optimization server 302, optimization framework 304, and maintenance application 306 do not install any software components within target VM $310_1$ to execute the maintenance operation on the target VM $310_1$. For example, components of optimization framework 304, such as framework agent 312 and framework APIs 314, are exclusively installed within maintenance application 306 and/or within a VM $235_1$ executing the maintenance application 306. Accordingly, optimization server 302, optimization framework 304, and maintenance application 306 may access data on the disk $320_1$ of the target VM $310_1$ directly (and thereby execute the maintenance operation on the disk $320_1$ and/or target VM $310_1$), without requiring the use of an intermediary maintenance agent or maintenance application installed within the target VM $310_1$.

Figure 4:
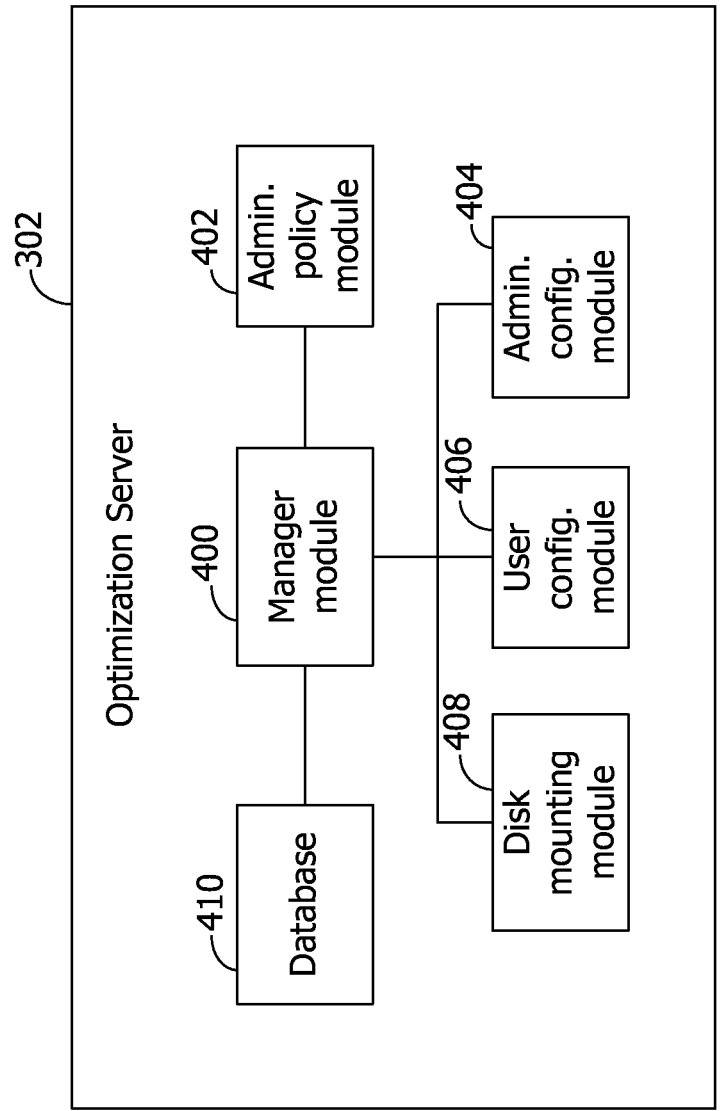
FIG. 4 is a block diagram of an exemplary optimization server that may be used with the optimization system shown in FIG. 3.

FIG. 4 is a block diagram of an exemplary optimization server 302. In an embodiment, optimization server 302 includes a manager module 400 that manages or controls the operation of optimization server 302. Optimization server 302 also includes an administrator policy module 402, an administrator configuration module 404, a user configuration module 406, a disk mounting module 408, and a database 410 that are each communicatively coupled to manager module 400. In an embodiment, each module of optimization server 302 is a program module that is stored in a computer readable media, such as memory 104 or memory 250, of optimization server 302 as a plurality of computer-executable instructions that are executed by a processor, such as processor 102 or processor 245. Moreover, database 410 is stored within the memory of optimization server 302 or within another system, such as a database server.

Manager module 400 controls the operation of optimization server 302, and directs or commands optimization server 302 to perform the functions described herein. For example, manager module 400 selects a maintenance application 306, and a maintenance operation associated with the maintenance application 306 to execute on a target VM $310_1$ (shown in FIG. 3). When the maintenance operation has been selected, manager module 400 transmits a maintenance command to framework agent 312, which in turn calls or invokes maintenance application 306 (both shown in FIG. 3) to cause the maintenance operation to be executed on the target VM $310_1$. The maintenance command may include user configuration settings, administrator configuration settings, and at least a portion of data associated with the target VM $310_1$, as described more fully herein. Manager module 400 also determines whether the target VM $310_1$ is offline, and mounts each disk $320_1$-$320_N$ of the target VM $310_1$ to the maintenance application 306, using disk mounting module 408, if the target VM $310_1$ is offline. Moreover, manager module 400 registers the maintenance application 306 with optimization server 302 to enable the maintenance application 306 to establish a trusted communication with optimization server 302. As used herein, the term "trusted communication" refers to communication between a first device and a second device where the first device has been authenticated with the second device to verify an identity of the first device. Such communication may also include encryption or other security measures to enhance the security of the trusted communication.

Administrator policy module 402 may be used to determine or select a plurality of policies or rules for optimization server 302 and/or for optimization system 300 (shown in FIG. 3) to control the operation thereof. For example, administrator policy module 402 may determine a frequency of maintenance operations to be performed for each target VM $310_1$-$310_N$, and/or may identify target VMs $310_1$-$310_N$ that should be excluded from a maintenance operation.

Administrator configuration module 404 enables optimization server 302 to configure settings of maintenance application 306. In some embodiments, administrator configuration module 404 enables settings of maintenance application 306 to be customized at one or more levels of a virtual infrastructure, such as one or more levels of a virtual infrastructure tree identified or displayed in VI Client, which is available from VMware, Inc. An administrator may use user input device 110 (shown in FIG. 1), or another suitable input device, to enter into administrator configuration module 404 and/or to cause optimization server 302 to generate (or update) a plurality of configuration settings (hereinafter referred to as "administrator configuration settings") for a maintenance application 306 (shown in FIG. 3). In an embodiment, administrator configuration settings are identified or selected for a maintenance application 306 and are used to configure maintenance operations performed on each target VM $310_1$-$310_N$ accessed by maintenance application 306. Such administrator configuration settings are stored in a configuration file (which is stored in database 410) and are transmitted to maintenance application 306 in preparation for executing one or more maintenance operations. In one embodiment, the administrator configuration settings are stored as one or more extensible markup language (XML) files to facilitate propagating the administrator configuration settings to maintenance applications 306 using framework agent 312.

User configuration module 406 enables optimization server 302 to configure settings of maintenance application 306 with respect to a single target VM $310_1$. For example, a user may use user input device 110, or another suitable input device, to enter into user configuration module 406, or to cause optimization server 302 to generate a plurality of configuration settings or to update existing configuration settings. Such configuration settings (hereinafter referred to as "user configuration settings") may be used to determine a specific configuration of a maintenance application 306 and/or may be applied to a maintenance operation to be executed on a target VM $310_1$. Moreover, the user configuration settings may override one or more administrative settings described above with respect to a target VM $310_1$. Additionally, a user may exclude a target VM $310_1$ from having a maintenance operation executed on the target VM $310_1$ by setting a predetermined user configuration setting. In an embodiment, the user configuration settings are stored as one or more XML files within database 410.

In some embodiments, an XML configuration file used for a disk defragmentation maintenance operation may include:

```
<ToolConfiguration name="DiskDefragmenter">
    <Configuration id="1" name="Compact Free Spaces"/>
    <Configuration id="2" name="Defrag and Optimize Disk"/>
    ....
</ ToolConfiguration >
```

In addition, in some embodiments, an XML configuration file used for a disk cleanup maintenance operation may include:

```
<ToolConfiguration name="DiskCleanUp">
<Configuration id="1" name="Clean Zero Length Files"/>
<Configuration id="2" name="Ignore System Files"/>
....
<IncludeFiles>
    <FilePattern>*.tmp</FilePattern>
    <FilePattern>*.swp</FilePattern>
    ....
</IncludeFiles>
<ExcludeFiles>
    <FilePattern>*.dat</FilePattern>
    ....
</ExcludeFiles>
</ToolConfiguration>
```

Disk mounting module 408 is used to mount one or more disks $320_1$-$320_N$ and/or disk files of a target VM $310_1$ to a VM $235_1$ (shown in FIG. 2) that is executing maintenance application 306. Database 410 stores data associated with system 300 to facilitate executing one or more maintenance operations. For example, database 410 may store inventory data or other data associated with target VMs $310_1$-$310_N$, such as a number of target VMs $310_1$-$310_N$ executing on a computing device 100 and/or within a hypervisor 210 (shown in FIG. 2), data regarding one or more datastores coupled to target VMs $310_1$-$310_N$, results of maintenance operations, and/or information required to mount one or more disks $320_1$-$320_N$. In addition, database 410 may store a list of maintenance applications 306 that have been registered with optimization server 302, data regarding a maintenance application 306 that is currently executing a maintenance operation selected by optimization server 302, a list of target VMs $310_1$-$310_N$ to be excluded from a maintenance operation, a plurality of user configuration settings for each target VM $310_1$-$310_N$, a plurality of administrator configuration settings for maintenance application 306, a history of maintenance operations that have been executed on each target VM $310_1$-$310_N$, and/or any other suitable data that enables optimization server 302 to function as described herein.

Figure 6:
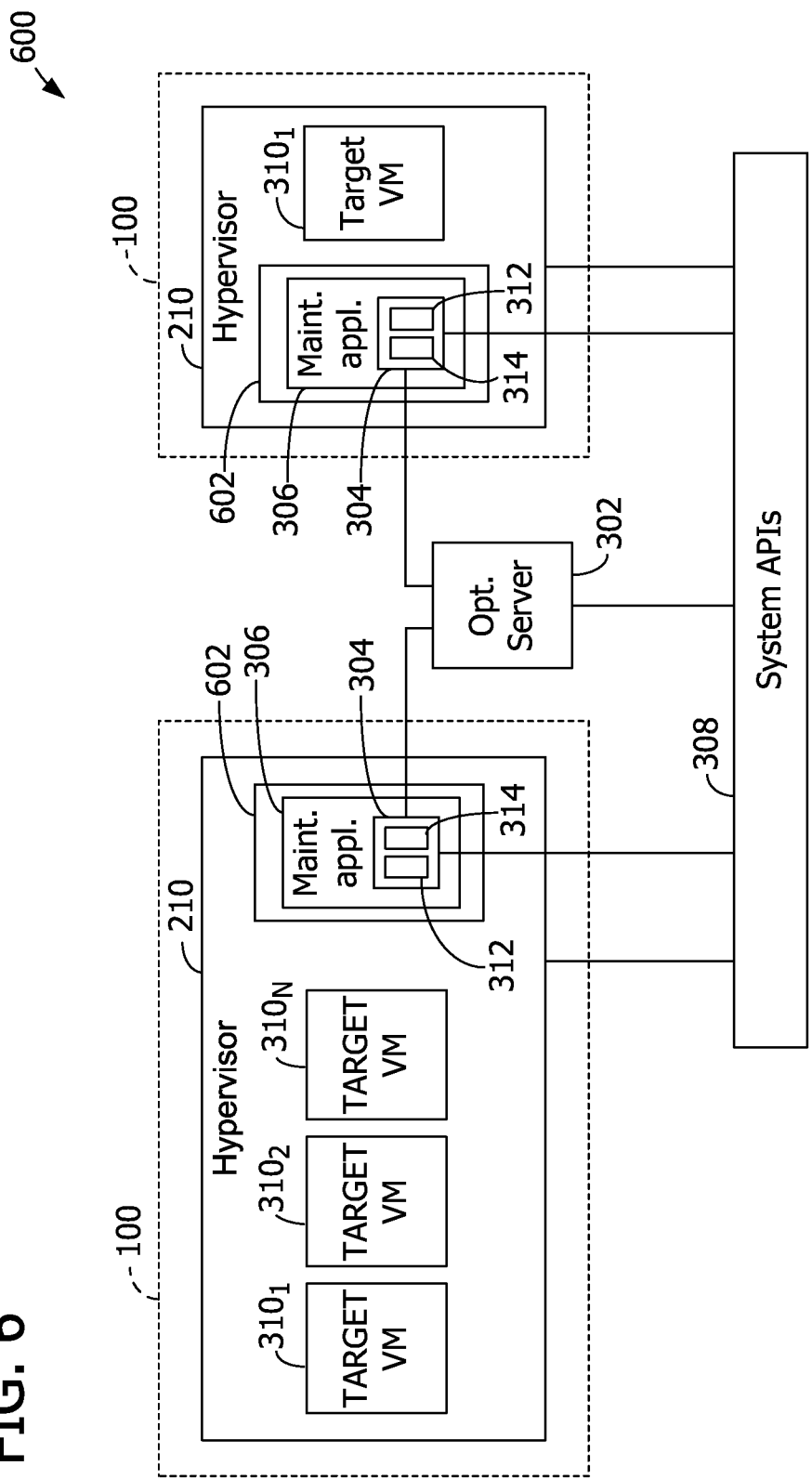
FIG. 6 is a block diagram of an exemplary optimization system that may be used to execute the method shown in FIGS. 5A and 5B.

FIGS. 5A and 5B are flowcharts of an exemplary method 500 for optimizing virtual machines, such as VMs $235_1$-$235_N$ (shown in FIG. 2). FIG. 6 is an exemplary optimization system 600 that may be used to execute method 500. Unless otherwise specified, optimization system 600 is substantially similar to optimization system 300 (shown in FIG. 3), and similar components are labeled in FIG. 6 with the same reference numerals used in FIG. 3. It should be recognized that the steps of method 500 may be manually initiated by a user or an administrator, or may be automatically initiated by an optimization server 302 within optimization system 600 and/or within optimization system 300.

As illustrated in FIG. 6, for example, a host computing device 100 includes a plurality of VMs $235_1$-$235_N$, such as a first, or maintenance VM 602, and a second, or target VM $310_1$. Any number of additional target VMs $310_2$-$310_N$ may also be included within a host computing device 100. In an embodiment, a maintenance application 306 is installed within the maintenance VM 602. Maintenance VM 602 and target VMs $310_1$-$310_N$ are installed or instantiated within hypervisor 210 of computing device 100. Moreover, computing device 100 includes an optimization framework 304 that includes a framework agent 312 and a plurality of framework APIs 314 (shown in FIG. 3) that are installed as part of maintenance application 306 and/or maintenance VM 602. Optimization framework 304 provides an interface to the maintenance application 306. In an embodiment, one or more disks $320_1$-$320_N$ of target VMs $310_1$-$310_N$ and/or of maintenance VM 602 are located or stored within at least one datastore (not shown) of optimization system 600. In some embodiments, a separate maintenance application 306 or maintenance VM 602 is installed for each datastore in optimization system 600 to facilitate accessing data within each datastore during the execution of a maintenance operation on an associated target VM $310_1$-$310_N$. Alternatively, a single maintenance application 306 or maintenance VM 602, or any number of maintenance applications 306 or maintenance VMs 602, are installed within optimization system 600 to execute one or more maintenance operations on one or more target VMs $310_1$-$310_N$.

An optimization server 302 is coupled to the maintenance application 306 through the optimization framework 304 (e.g., through framework agent 312) for accessing the maintenance application 306. In addition, the optimization server 302 registers the maintenance application 306 as described herein. The optimization server 302 is configured to select a maintenance operation to execute on the target VM $310_1$, command the maintenance application 306 to execute the maintenance operation on the target VM $310_1$, and receive the results of the maintenance operation. It should be recognized, as illustrated in FIG. 6, that optimization server 302 may be coupled to a plurality of computing devices 100 and/or maintenance applications 306 installed within maintenance VMs 602 of the computing devices 100. Accordingly, optimization server 302 may cause a plurality of maintenance operations to be executed on a plurality of target VMs $310_1$-$310_N$ executing on one or more computing devices 100.

In an embodiment, method 500 is at least partially executed by one or more computing devices 100 (shown in FIG. 1) and/or one or more VMs $235_1$-$235_N$. For example, a plurality of computer-executable instructions is embodied within a computer-readable medium, such as memory 104 or memory 250. The instructions, when executed by a processor, such as processor 102 or processor 245, cause the processor to execute the steps of method 500 and/or to function as described herein. While method 500 is described with respect to one maintenance application 306 and target VM $310_1$, it should be recognized that method 500 may be used with a plurality of maintenance applications 306 and/or target VMs $310_1$-$310_N$ in a similar manner as described herein.

As shown in FIG. 5A, configuration settings are generated 502 for one or more maintenance applications 306. More specifically, an administrator initially uses, or configures, maintenance application 306 to generate a plurality of administrator configuration settings for maintenance application 306. An XML file (i.e., administrator configuration file or template) is generated by maintenance application 306 and is stored in optimization server 302 (e.g., within database 410). In some embodiments, generating 502 the initial administrator configuration settings is a one-time manual operation performed by the administrator. In an embodiment, the maintenance application 306 is installed within a dedicated maintenance VM 602 that is separate from target VMs $310_1$-$310_N$.

One or more maintenance applications 306 are registered 504 with optimization server 302. In an embodiment, the administrator selects a maintenance application 306 and registers 504 the maintenance application 306 with optimization server 302 by associating, with optimization server 302, a name of the maintenance application 306, a description of the maintenance application 306, a list of maintenance operations that maintenance application 306 is able to execute, and one or more configuration files associated with maintenance application 306. In an embodiment, upon registration of the maintenance application 306, optimization server 302 generates a registration key for the maintenance application 306 that enables the maintenance application 306 to establish a trusted or authenticated communication with optimization server 302 for performing or executing maintenance operations. The registration key is stored 506 in a predetermined location within the maintenance application 306 (i.e., within the maintenance VM 602), for use by maintenance application 306 in establishing a trusted communication with optimization server 302. In an embodiment, after registering 504 a maintenance application 306, an administrator may input administrator configuration settings into optimization server 302 using administrator configuration module 404 and a user may input user configuration settings into optimization server 302 using user configuration module 406 (both shown in FIG. 4) to customize the configuration settings generated 502 for the maintenance application 306.

As shown in FIG. 5B, optimization server 302 selects 508, without user intervention, a maintenance application 306 to call, a target VM $310_1$, and a maintenance operation to execute on the target VM $310_1$ based on predetermined administrator policies. Alternatively, the user or administrator, using optimization server 302, selects 508 a maintenance application 306 (e.g., from a list of registered maintenance applications 306), a target VM $310_1$, and a maintenance operation to execute on the target VM $310_1$. A profile, or "snapshot," of the target VM $310_1$ is taken and/or stored 510 by optimization server 302 before the maintenance operation is executed, for example, using one or more VC Server brand tools which are available from VMware, Inc.

Optimization server 302 determines 512 whether the target VM $310_1$ is offline. If the target VM $310_1$ is offline, the disk $320_1$ or disks $320_1$-$320_N$ of the target VM $310_1$ are mounted 514 to the maintenance application 306, i.e., to the maintenance VM 602. Optimization server 302 then instructs or commands the maintenance application 306 to execute the maintenance operation. More specifically, optimization server 302 transmits 516 a command (i.e., a maintenance command) to execute the maintenance operation to the framework agent 312. The maintenance command includes configuration data from the user configuration file and/or the administrator configuration file.

More specifically, in an embodiment, optimization server 302 determines whether user configuration settings exist for the target VM $310_1$. If user configuration settings exist, optimization server 302 includes the user configuration settings in the maintenance command transmitted to maintenance application 306. However, if no user configuration settings exist for target VM $310_1$, optimization server 302 determines if user configuration settings exist for any "ancestors" of the target VM $310_1$ (i.e., any machines or devices at a higher infrastructure level than target VM $310_1$ and that have configuration settings or other settings or data inherited by the target VM $310_1$). If an ancestor of the target VM $310_1$ includes user configuration settings, these settings are used for the target VM $310_1$ and are included within the maintenance command transmitted to maintenance application 306. If no user configuration settings exist for the target VM $310_1$ or an ancestor of the target VM $310_1$, the administrator configuration settings for maintenance application 306 are used and included within the maintenance command.

In an embodiment, a component of optimization framework 304, such as framework agent 312, is used to execute 518 the maintenance operation on the target VM $310_1$, for example, by calling a function identified in an interface API 318 (shown in FIG. 3) that is implemented by the maintenance application 306 using the data contained in the maintenance command. In an embodiment, if target VM $310_1$ is offline, the maintenance application 306 executes 518 the maintenance operation by receiving the data from the disk $320_1$ of target VM $310_1$ and analyzing or cleaning the data received. If the target VM $310_1$ is online, the maintenance application 306 executes 518 the maintenance operation in the target VM $310_1$ and/or disk $320_1$ based on the type of the maintenance operation.

Framework agent 312 determines 520 whether user intervention is requested, for example, by analyzing the maintenance command and/or configuration settings received from optimization server 302. If user intervention is requested, the maintenance results (e.g., the analysis report and/or the recommended actions) are transmitted or displayed to the user, and the user selects one or more actions to implement based on the maintenance results. In one embodiment, a component of the optimization framework 304, such as framework agent 312, is used to transmit the maintenance results from maintenance application 306 to optimization server 302, and optimization server 302 transmits or displays the results to the user.

After the user selects the actions to be performed, maintenance application 306 implements 522 the user selected actions. If, however, user intervention is not requested, maintenance application 306 automatically implements 524 the recommended actions and/or actions identified by maintenance application 306. Framework agent 312 then determines 526 whether the maintenance operation completed successfully (e.g., whether the actions were implemented successfully), for example, by analyzing a termination or completion message of the maintenance operation generated by the maintenance application 306. If the maintenance operation completed successfully, optimization server 302 may execute other maintenance operations on the same target VM $310_1$ and/or on other target VMs $310_2$-$310_N$ by returning to selecting 508 a maintenance application 306 to call, a target VM $310_1$, and a maintenance operation to execute on the target VM $310_1$. However, if the maintenance operation did not complete successfully, the target VM $310_1$ and/or the disk $320_1$ of the target VM $310_1$ may be restored 528, from the stored profile or snapshot, to a state of the target VM $310_1$ and/or disk $320_1$ before the maintenance operation was executed. In some embodiments, the target VM $310_1$ is restored 528 using one or more software tools or applications within VC server, which is available from VMware, Inc.

Exemplary Operating Environment

The optimization system as described herein may be performed by a computer or computing device. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The embodiments illustrated and described herein as well as embodiments not specifically described herein but within the scope of aspects of the disclosure constitute exemplary means for maintaining high availability of software application instances, such as virtual machines.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for executing a maintenance operation on a virtual machine (VM), the system comprising:
   a host computing device comprising:
      a first VM and a second VM;
      a maintenance application installed within the first VM; and
      an optimization framework providing an interface to the maintenance application, wherein the optimization framework comprises a framework agent and a plurality of framework application programming interfaces; and
   an optimization server coupled to the maintenance application through the optimization framework, wherein the optimization server comprises a processor that is programmed to:

select a maintenance operation to execute on the second VM;
command the maintenance application to execute the maintenance operation on the second VM; and
receive the results of the maintenance operation.

2. The system of claim 1, wherein the processor is further programmed to register the maintenance application to enable the maintenance application to establish a trusted communication with the optimization server.

3. The system of claim 1, wherein the optimization server causes a profile of the second VM to be stored before executing the maintenance operation on the second VM.

4. The system of claim 1, wherein the optimization server determines whether the second VM is offline before commanding the maintenance application to execute the maintenance operation on the second VM.

5. The system of claim 4, wherein the optimization server mounts at least one disk of the second VM to the maintenance application if the second VM is determined to be offline.

6. The system of claim 5, wherein the maintenance application executes the maintenance operation by accessing data from the mounted disk.

7. The system of claim 1, wherein the maintenance application executes the maintenance operation on the second VM without installing any component of the maintenance application in the second VM.

8. The system of claim 1, wherein the processor is further programmed to:
determine if user configuration settings for the second VM exist;
if the user configuration settings exist for the second VM, including the user configuration settings in the command to execute the maintenance operation on the second VM;
if the user configuration settings do not exist for the second VM, utilize a set of user configuration settings from a computing device at a higher infrastructure level than the second VM.

9. A method of executing a maintenance operation on a virtual machine (VM), the method comprising:
accessing a maintenance application installed within a first VM executing on a host computing device;
registering the maintenance application;
selecting, by an optimization server, a maintenance operation to execute on a second VM executing on the host computing device; and
commanding, by the optimization server, the registered maintenance application to execute the maintenance operation on the second VM.

10. The method of claim 9, further comprising storing a registration key within the maintenance application.

11. The method of claim 10, further comprising establishing a trusted communication between the maintenance application and the optimization server using the registration key.

12. The method of claim 9, further comprising generating, by the optimization server, a plurality of administrator configuration settings for the maintenance application, wherein the administrator configuration settings identify settings to be applied to each maintenance operation executed by the maintenance application.

13. The method of claim 12, further comprising generating, by the optimization server, a plurality of user configuration settings for the maintenance application, wherein the user configuration settings identify settings to be applied to the maintenance operation to be executed on the second VM.

14. The method of claim 13, wherein commanding the maintenance application to execute the maintenance operation comprises transmitting a maintenance command, including at least one of (A) the user configuration settings and (B) the administrator configuration settings, to the maintenance application.

15. A non-transitory computer-readable storage medium having computer executable instructions embodied thereon, wherein, when executed by a processor, the computer-executable instructions cause the processor to:
instantiate a first virtual machine (VM) and a second VM;
install a maintenance application within the first VM;
install at least a component of an optimization framework within the first VM, wherein no components of the optimization framework are included within the second VM;
receive, from an optimization server, a maintenance command including a maintenance operation to be executed on the second VM;
execute the maintenance operation on the second VM using the component installed within the first VM; and
transmit the results of the maintenance operation to the optimization server using the component installed within the first VM.

16. The non-transitory computer-readable storage medium of claim 15, wherein the computer executable instructions further cause the processor to determine whether user intervention is requested for the maintenance operation.

17. The non-transitory computer-readable storage medium of claim 16, wherein the computer executable instructions further cause the processor to implement at least one user selected action on the second VM if the processor determines that user intervention is requested.

18. The non-transitory computer-readable storage medium of claim 16, wherein the computer executable instructions further cause the processor to implement at least one action recommended by the maintenance application if the processor determines that no user intervention is requested.

19. The non-transitory computer-readable storage medium of claim 15, wherein the computer executable instructions further cause the processor to restore the second VM from a stored profile of the second VM if the processor determines that the maintenance operation did not complete successfully.

20. The non-transitory computer-readable storage medium of claim 15, wherein the computer executable instructions further cause the processor to register the maintenance application with the optimization server.

21. An optimization server for improving operation of at least one target virtual machine (VM), the optimization server comprising:
a user configuration module that when executed by a processor, receives at least one user configuration setting for a maintenance operation to be executed on a target VM by a maintenance application;
an administrator configuration module that when executed by the processor, receives at least one administrator configuration setting for the maintenance operation;
a database that when executed by the processor, stores data associated with the target VM, wherein the data includes the user configuration settings and the administrator configuration settings; and
a manager module, that when executed by the processor, controls an operation of the optimization server and transmits a maintenance command to the maintenance application, wherein the maintenance command causes the maintenance operation to be executed on the target VM, and wherein the maintenance command includes at least one of (A) the user configuration settings and (B) the administrator configuration settings.

22. The optimization server of claim 21, wherein the manager module determines whether the target VM is offline.

23. The optimization server of claim 22, wherein the target VM includes at least one disk, the optimization server further comprising a disk mounting module for mounting each disk of the target VM to the maintenance application if the target VM is offline.

24. The optimization server of claim 21, wherein the manager module causes the maintenance operation to be executed on the target VM by transmitting the maintenance command to the maintenance application.

25. The optimization server of claim 21, wherein the manager module registers the maintenance application with the optimization server to enable the maintenance application to establish a trusted communication with the optimization server.

26. The optimization server of claim 21, wherein the target VM is a VM template, the optimization server causes the maintenance operation to be executed on the VM template.

27. The optimization server of claim 21, wherein the target VM is one of a plurality of target VMs, the optimization server causes the maintenance operation to be executed on each of the plurality of target VMs.

* * * * *